United States Patent [19]

Rosaen

[11] 4,346,607

[45] Aug. 31, 1982

[54] FLUID FLOW METER WITH IMPROVED SEALING MEANS

[76] Inventor: Nils O. Rosaen, 1755 E. Nine Mile, Hazel Park, Mich. 48030

[21] Appl. No.: 133,622

[22] Filed: Mar. 24, 1980

[51] Int. Cl.³ ............................................... G01F 1/28
[52] U.S. Cl. .................................. 73/861.75; 116/275
[58] Field of Search ...................... 116/275; 73/861.75, 73/861.76, 861.74

[56] References Cited

U.S. PATENT DOCUMENTS

| | | | |
|---|---|---|---|
| 3,282,102 | 11/1966 | Rosaen | 73/861.75 |
| 3,685,354 | 8/1972 | Rosaen | 73/861.75 |
| 3,776,037 | 12/1973 | Rosaen | 73/861.75 |

FOREIGN PATENT DOCUMENTS

| | | | |
|---|---|---|---|
| 11442 | of 1904 | United Kingdom | 73/861.75 |
| 512330 | 9/1939 | United Kingdom | 73/861.75 |
| 585523 | 2/1947 | United Kingdom | 73/861.75 |

*Primary Examiner*—Stuart S. Levy
*Assistant Examiner*—Denis E. Corr

*Attorney, Agent, or Firm*—Gifford, VanOphem, Sheridan and Sprinkle

[57] ABSTRACT

A flow meter is provided having a housing with inlet and outlet ports respectively adapted to be connected with a source of fluid pressure and a fluid user. A semicircular vane member mounted within the housing is movable in response to a change in the flow rate between the inlet and outlet ports to rotate a shaft to which the vane member is attached. The shaft, in turn, extends externally of the housing and is operatively coupled to an indicator for providing an external visual indication of the rate of fluid flow through the flow meter. The improvement, however, comprises a unitary spring seal having a first portion rigidly secured to the housing and a second portion which extends between the housing and the vane shaft. This second portion extends along the shaft within the housing and is resiliently urged against the outer peripheral surface of the shaft in order to prevent fluid leakage between the vane shaft and the housing.

6 Claims, 6 Drawing Figures

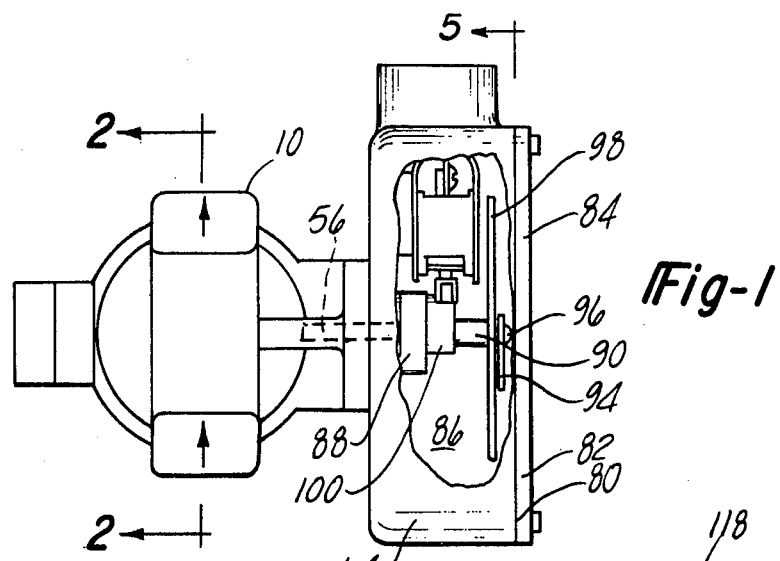
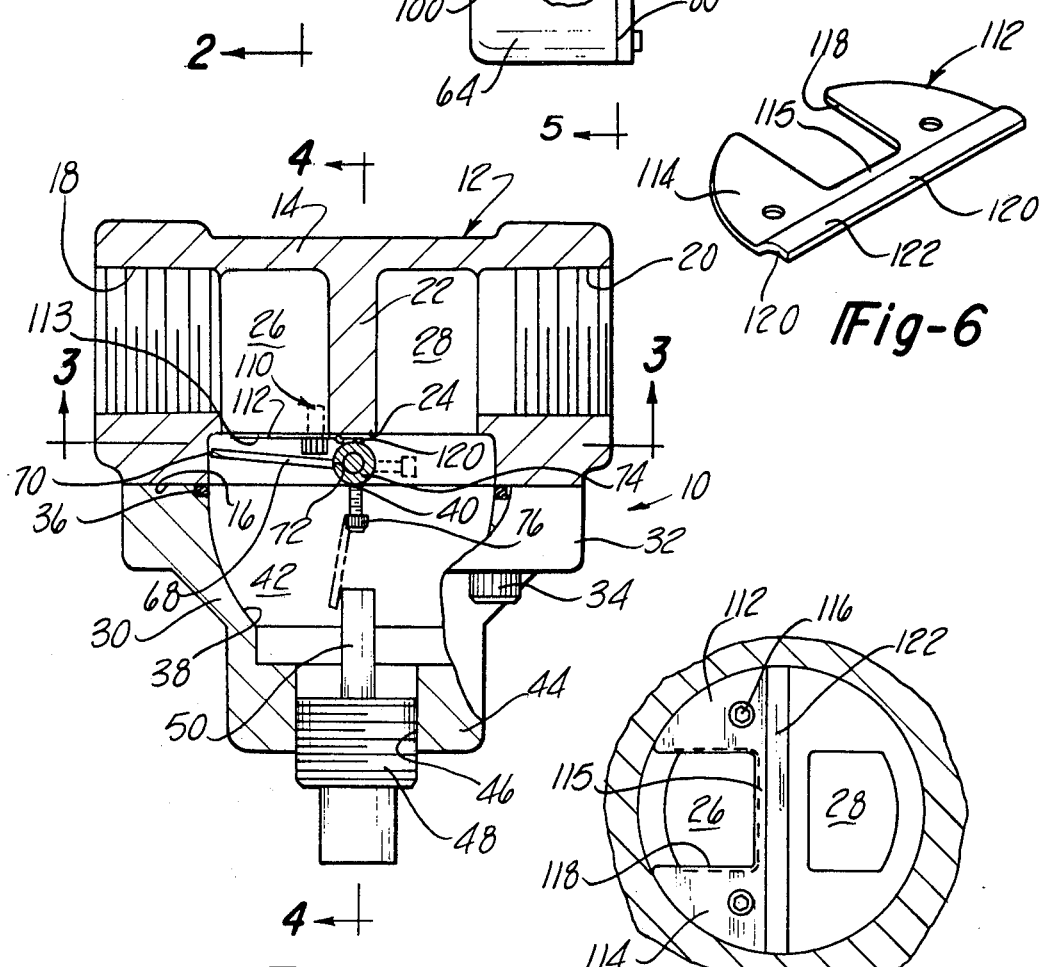

FLUID FLOW METER WITH IMPROVED SEALING MEANS

BACKGROUND OF THE INVENTION

I. Field of the Invention

The present invention relates generally to fluid flow meters and, more particularly, to a fluid meter with new and improved means for providing a seal between the vane member and an internal wall which separates the inlet and outlet ports for the flow meter.

II. Description of the Prior Art

A variety of measuring devices and the like are now available for supplying information regarding the rate of flow in a fluid flow system. One such type of instrument, commonly called a flow meter, comprises a rate flow indicator in which a semicircular vane member is rotatably mounted and movable by fluid flow through the device. The vane member is connected with indicating means to indicate exteriorly of the device the rotational position of the vane member and thus the rate of flow through the device.

As the semicircular vane member is rotated by fluid flowing through the device, it moves along a hemispherical wall section having its pivotal axis offset from the center of the wall section so that pivotal movement of the vane creates an opening between the outer edge of the vane and the wall section. This opening increases in cross-sectional area as the vane moves from a closed and to a maximum open position. In this way, the flow meter does not unduly interfere with the rate of fluid flow through the device.

One problem associated with such flow meters is that the leakage past the edge of a vane member in the area where the vane member is pivotally mounted will seriously impair the accuracy of the device and this is particularly true for high fluid pressure applications. Previous attempts to cure this problem by providing a seal between the vane shaft and the housing oftentimes results in a large amount of friction between the seal and the vane shaft. Such friction in turn inhibits the movement of the vane member and thus adversely effects the accuracy of the flow meter.

One previously known device designed to overcome this problem is disclosed in U.S. Pat. No. 3,776,037, entitled "FLOW INDICATOR DEVICE WITH SEALING MEANS" which issued on Dec. 4, 1973. In this prior patent, a teflon shoe is mounted in a slot formed within the housing so that one edge of the teflon shoe abuts against the vane shaft. Compression springs are also positioned between the housing and the other edges of the teflon shoe and urge the teflon shoe against the vane shaft. While this prior known device has proven effective in use, it is relatively expensive to construct the housing with the necessary receiving slot for the teflon shoe and its associated springs.

SUMMARY OF THE PRESENT INVENTION

The present invention provides a solution to this problem by providing an inexpensive and yet effective means for sealing the vane member about its vane shaft to prevent leakage from the inlet to the outlet port of the flow meter.

In brief, the flow meter of the present invention comprises a housing having an inlet port and an outlet port and a flow responsive vane member carried within the housing between the inlet and outlet ports. The vane member is secured to a shaft which is rotatably mounted to the housing and the shaft in turn is operatively connected with an indicator means externally of the housing. A housing wall separates the inlet port from the outlet port and the vane member is rotatably mounted within the housing chamber adjacent the free edge of the housing wall. As with the previously known flow meters, the outer circular edge of the vane cooperates with a hemispherical wall section having its center offset from the axis of rotation of the vane. Thus, rotation of the vane creates an opening having a variable cross-sectional area between the outer circular edge of the vane member and the hemispherical wall portion.

The novelty of the instant invention, however, lies in the provision of an improved means for sealing the vane to the free edge of the housing wall in order to prevent fluid leakage between the wall and the vane member. The improved sealing means comprises a unitary and substantially planar spring member which is constructed of a resilient material, such as spring metal. One portion of the spring member is rigidly secured to the flow meter housing while a second portion of the spring member abuts against the vane member around its pivotal mounting means for substantially the entire length of the vane member. Moreover, the resilient spring member is formed so that the second portion of the spring member resiliently abuts and seals against the vane member.

In the preferred form of the invention, the second portion of the spring member is shaped to conform to the outer periphery of the vane member mounting means in order to minimize friction between the seal member and the vane member. Thus, a sealing contact is maintained between the spring member and the vane member mounting means without unduly interfering with the rotation of the vane member.

BRIEF DESCRIPTION OF THE DRAWING

A better understanding of the present invention will be had upon reference to the following detailed description when read in conjunction with the accompanying drawing wherein like reference characters refer to like parts throughout the several views, and in which:

FIG. 1 is a top view of a flow meter constructed in accordance with the present invention and with parts broken away;

FIG. 2 is a sectional view taken substantially along line 2—2 in FIG. 1 and enlarged for clarity;

FIG. 3 is a fragmentary sectional view taken substantially along line 3—3 in FIG. 2;

FIG. 6 is a perspective view illustrating one component of the flow meter of the present invention.

DETAILED DESCRIPTION OF THE PRESENT INVENTION

Figure 4:
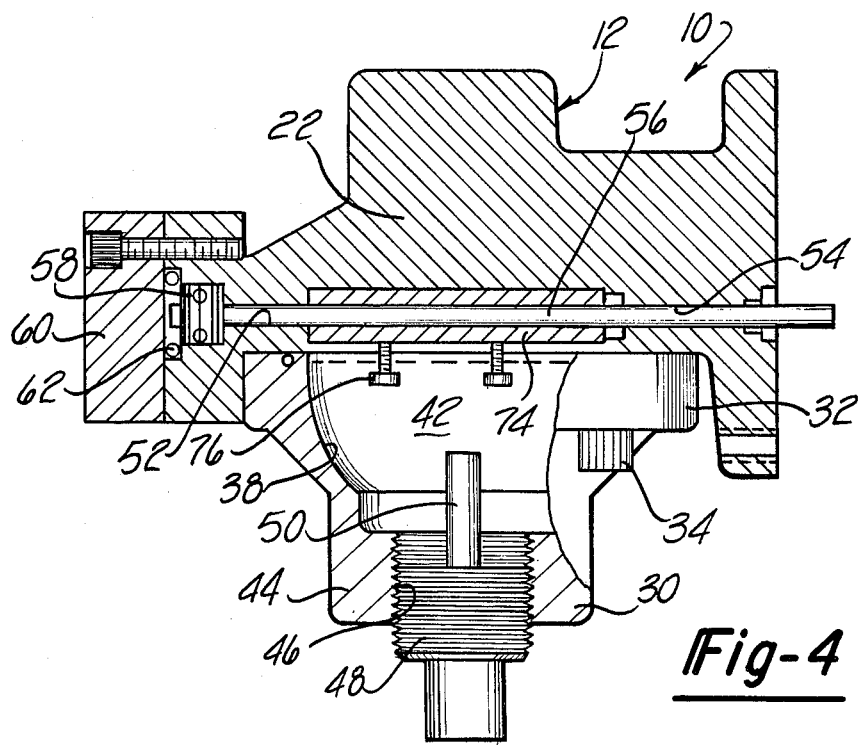
FIG. 4 is a sectional view taken substantially along line 4—4 in FIG. 2.

With reference first to FIGS. 1, 2 and 4, the fluid flow meter 10 according to the present invention is thereshown and includes a housing 12 having an upper wall 14 and a lower circular flange 16. A fluid inlet port 18 is internally threaded for connection with a fluid system (not shown) via standard fluid connectors. Similarly the housing 12 also includes an outlet port 20 which is internally threaded for connection with a fluid system via conventional fluid fittings.

Referring now to FIG. 2, an interior wall 22 extends downwardly from the upper housing wall 14 and has a lower free edge 24 which terminates short of the housing circular flange 16. The internal wall 22 separates the inlet 18 from the outlet 20 and defines an inlet chamber 26 and an outlet chamber 28. Each of the chambers 26 and 28 are open through the lower end of the housing 12 but are on opposite sides of the internal wall 22.

With reference to FIGS. 2 and 4, the flow meter 10 further includes a bowl 30 having an outwardly extending annular mounting flange 32 which registers with the lower end 16 of the housing 12. The bowl 30 is secured to the housing 12 by bolts 34 and appropriate sealing means 36, such as an O-ring, are disposed between the bowl 30 and housing 12 to fluidly seal them together.

The bowl 30 has an interior hemispherical surface 38 with a center at point 40 and thus defines an interior flow chamber 42 which is open through the upper end of the bowl 30. The bowl 30 also includes a lower stem 44 wih an interiorly threaded throughbore 46 which is open to the chamber 42. A plug 48 having a pin 50 secured to it is threadably connected to the bore 46 so that the pin 50 extends upward and into the flow chamber 42 for a reason to be subsequently described. Suitable means are also provided for fluidly sealing the plug 48 to the bowl 30.

Referring now particularly to FIG. 4, registering bores 52 and 54 are formed through the housing 12 so that the bores 52 and 54 are substantially parallel to the lower edge 24 of the housing wall 22. The bores 52 and 54 are spaced downwardly from the edge 24 of the wall 22 but at a position above the center 40 of the hemispherical wall surface 38. A shaft 56 is positioned through the bores 52 and 54 and, at one end, is rotatably mounted to the housing 12 by a bearing assembly 58. This end of the housing 12 is then closed by a closure cap 60 and a suitable seal 62 prevents fluid leakage along the shaft 56. The other end of the shaft 56 extends externally of the housing 12 and into the interior of an indicator housing (FIG. 1) 64 for a reason to be shortly described. The indicator housing 64 also is secured to the flow meter housing 12 by suitable means, such as bolts (not shown).

Referring now to FIGS. 2 and 4, a vane member 68 is provided having an outer semicircular edge 70 and an inner straight edge 72. A tubular and cylindrical sleeve 74 is secured to or formed as a part of the straight edge 72 of the vane member 68. The shaft 56 extends through the sleeve 74 and the sleeve 74 is secured to the shaft 56 by any suitable means, such as screws 76. Thus, the vane member 68 rotates in unison with the shaft 56.

Preferably, the radius of the vane member 68 is substantially the same as the radius of the hemispherical wall section 38. The axis of rotation of the vane member 68, however, is spaced upwardly from and thus offset from the center 40 of the hemispherical wall section 38. Thus, rotation of the vane member 68 creates a curved opening between the outer edge 70 of the vane member 68 and the hemispherical wall 38 which increases in cross-sectional area as the vane member 68 is rotated from its closed position illustrated in solid line in FIG. 2, to its open position, illustrated in phantom line in FIG. 2. the pin 50, moreover, limits the maximum open rotation of the vane member 68.

Figure 5:
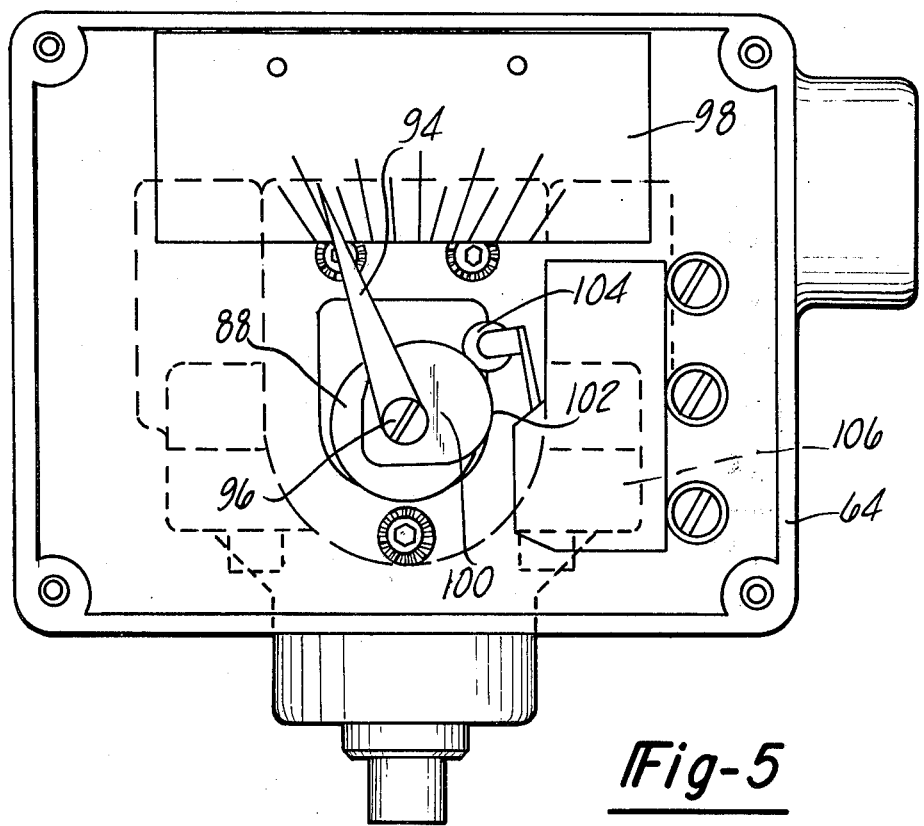
FIG. 5 is a side view of the indicator means taken substantially along line 5—5 in FIG. 1.

With reference now to FIGS. 1 and 5, the indicator housing 64 is open at one end 80 and this open end 80 is in turn closed by a cover plate 82 having a transparent window 84. The indicator housing 64 and cover 82 thus defines an indicator housing chamber 86 into which the shaft 56 at least partially extends. A cylindrical shaft extension 88 having a coaxial stem 90 is secured to the portion of the shaft 56 extending into the indicator housing 64 by any suitable means. The shaft extension 88 further includes a spring mechanism (not shown) which resiliently urges the shaft 56 with its attached vane member 68 to a closed position, i.e. with the vane member 68 adjacent the inlet chamber 26.

An indicator needle 94 is secured at one end to the free end of the shaft extension stem 90 by a screw 96. The other end of the indicator needle cooperates within indicia plate 98 secured to the housing 64. The indicia plate 98 is visible through the window 84 on the cover plate 82 and the position of the indicator needle 94 with respect to the indicia plate 98 is indicative of the rotational position of the vane member 68 and thus of the flow rate through the flow meter.

Still referring to FIGS. 1 and 5, a cam member 100 having an outer cam surface 102 is secured to the shaft extension stem 90 by any suitable means. A cam follower 104 on an electrical switch 106 abuts against the cam surface 102 so that the cam surface 102 activates the switch 106 at a predetermined rotational position of the shaft 56. The switch 106, for example, can be secured to an alarm system to activate the alarm system when the fluid flow through the flow meter falls below a predetermined lower limit.

The novelty of the instant invention, however, resides in the means for sealing the sleeve 74 on the vane member 68 to the interior wall 22 in order to prevent fluid leakage between the vane member and the interior wall 22.

With reference then to FIGS. 2, 3 and 6, the improved sealing means 110 of the present invention is thereshown and comprises a substantially planar seal member 112 which is made of a resilient material and preferably spring metal. The seal member 112 is preferably of a unitary construction.

The seal member 112 further includes a first portion 114 which flatly abuts across the lower end 113 of the housing 12 beneath the inlet chamber 26 and is rigidly secured to the housing 12 by bolts 116. The seal member 112, however, includes an opening 118 formed through it which registers with the inlet chamber 26. The opening 118 ensures that the fluid flow from the inlet chamber 26 and into the bowl chamber 42 is unimpeded by the seal member 112 and the fluid flow is in a direction generally perpendicular to the plane of the seal member 112. Moreover, an intermediate part 115 of the first portion flatly abuts against the lower end 113 of the housing 12 between the inlet chamber 26 and the housing wall 22.

Still referring to FIGS. 2, 3 and 6, the seal member 112 includes a second portion 120 spaced downwardly (FIG. 2) from the first portion 114 and having an abutment surface 122 which abuts against the vane mounting sleeve 74 along substantially the entire length of the sleeve 74 as best seen in FIG. 3 within the bowl chamber 42. Moreover, the seal member 112 is formed so that the surface 122 is resiliently urged against the sleeve 74 and, in the preferred form of the invention, the surface 122 is arcuate and conforms with the outer peripheral surface of the sleeve 74. By this arrangement, the second portion 120 of the seal member 112 resiliently and sealingly engages the vane mounting sleeve 74 while at the same time minimizing the frictional engagement between the seal member second portion 120 and the sleeve 74.

In operation, fluid flow into the housing inlet 18 rotationally displaces the vane member 68 in an amount proportional to the fluid flow rate and in the well known manner. This rotational displacement of the vane member 68 is imparted to the shaft 56 which in turn rotates the needle 94 to provide an indication on the indicia plate 98 of the fluid flow rate through the flow meter.

The means 110 for sealing the vane sleeves 74 to the internal wall 22 of the housing 12 effectively prevents the leakage of fluid between the sleeve 74 and the internal wall 22. The seal member 112 is further advantageous in that the flow of fluid from the fluid inlet chamber 26 and into the bowl chamber 42 is substantially perpendicular to the plane of the seal member 112 so that the noral flow of fluid is directed around the outer circular periphery 70 of the vane member 68 in the desired fashion. Moreover, the seal member 112 is further advantageous in that it can be inexpensively constructed and easily and rapidly installed in the flow meter by simply screwing the first portion 114 of the seal member 112 to the housing 12.

The flow meter 10 according to the present invention is particularly advantageous for high pressure applications where any inaccuracy of the vane member 68 caused by friction between the seal member 112 and the vane sleeve 74 is negligible. In any event, the sleeve 74 is typically constructed of metal and the metal to metal contact between the sealing surface 122 and the vane sleeve 74 is minimized. The bearing assembly 58 between the housing 112 and the vane shaft 56 also enhances the free rotation of the vane shaft 56.

As is best seen in FIG. 2, the second portion 120 of the seal member 112 is spaced downwardly from the housing, and during operation of the flowmeter, debris in the fluid will accumulate between the second portion 120 of the seal member 112 and the vane sleeve 74. However, since the seal member 112 is constructed of a resilient material, upon the application of a shock force to the seal member 112, the seal member 112 deflects upwardly toward the housing thus forming a space between the seal member 112 and vane sleeve 74 for a very short period of time. During this short period of time, however, a portion of the influent flows from the inlet chamber 26, between the seal member 112 and vane sleeve 74 and to the outlet chamber 28 thus removing any accumulated debris between the seal member 112 and the vane sleeve 74.

Having described my invention, however, many modifications thereto will become apparent to those skilled in the art to which it pertains without deviation from the spirit of the invention as defined by the scope of the appended claims.

I claim:

1. A flow indicator device for a fluid system comprising a housing having a chamber, an inlet port and an outlet port registering with said chamber and adapted to be connected with said system; an interior wall extending into said chamber intermediate said inlet port and said outlet port; a vane member rotatably mounted in said housing on an axis disposed closely adjacent the free edge of said interior wall whereby said wall and said vane member cooperate to separate said inlet port from said outlet port; said housing being provided with interior walls having a substantially semi-spherical inner surface, said vane member having a substantially semi-circular edge rotatable adjacent said semi-spherical surface, the center of said semi-spherical surface being displaced from the center of the semi-sphere circumscribed by said circular edge upon rotation of said vane member, whereby the space between said edge and said surface varies at each rotative position of said vane member; a shaft having opposite ends rotatably mounted in said housing; means mounting said vane member to said shaft such that said vane member rotates with said shaft about the axis of rotation of said shaft; the improvement comprising a one piece seal member, said seal member being thin walled and constructed of a resilient material, said seal member having a first portion and means for rigidly securing said first portion to said housing so that part of said first portion flatly abuts against said housing, and a second portion of said seal member formed at an end of said first portion and extending between said housing interior wall and said mounting means, said second portion extending substantially entirely along and abutting against the outer peripheral surface of said mounting means to prevent fluid leakage between said vane mounting means and said housing interior wall and wherein said seal member is formed so that said second portion of said seal member is resiliently urged against said mounting means when said first portion of said seal member is secured to said housing.

2. The invention as defined in claim 1 wherein said seal member is made of spring metal.

3. The invention as defined in claim 1 wherein said first portion of said seal member is planar and includes an opening in registry with the inlet port and through which the influent to said device passes.

4. The invention as defined in claim 3 wherein a part of the first portion of said seal member between said opening and said vane shaft flatly abuts against the housing and extends substantially entirely along the length of said vane shaft within said chamber.

5. The invention as defined in claim 3 wherein the first portion of the seal member is secured to said housing by threaded fasteners.

6. The invention as defined in claim 1 and in which said mounting means comprises a sleeve secured to said shaft, said sleeve having a cylindrical outer periphery around at least a portion thereof, and wherein a part of said second portion of said seal member conforms in shape to said cylindrical portion of said sleeve.

* * * * *

UNITED STATES PATENT AND TRADEMARK OFFICE
CERTIFICATE OF CORRECTION

PATENT NO. : 4,346,607
DATED : August 31, 1982
INVENTOR(S) : Nils O. Rosaen

It is certified that error appears in the above—identified patent and that said Letters Patent is hereby corrected as shown below:

Column 3, line 20, after "44" delete "wih" and insert thereinstead --with--.

Signed and Sealed this

Twenty-first Day of December 1982

[SEAL]

Attest:

Attesting Officer

GERALD J. MOSSINGHOFF
Commissioner of Patents and Trademarks